United States Patent [19]
Okayama et al.

[11] Patent Number: 5,786,916
[45] Date of Patent: Jul. 28, 1998

[54] OPTICAL-WAVELENGTH INTERCHANGER ELEMENT AND OPTICAL-WAVELENGTH INTERCHANGER DEVICE

[75] Inventors: Hideaki Okayama; Chang Qing Xu, both of Tokyo, Japan

[73] Assignee: Oki Electric Industry Co., Ltd, Tokyo, Japan

[21] Appl. No.: 663,875

[22] Filed: Jun. 19, 1996

[30] Foreign Application Priority Data

Jun. 30, 1995 [JP] Japan ................................. 7-165251

[51] Int. Cl.⁶ ............................................ H04J 14/02
[52] U.S. Cl. ............................. 359/128; 359/124; 385/24
[58] Field of Search ............................. 359/124–126, 359/128, 133; 385/24, 39

[56] References Cited

U.S. PATENT DOCUMENTS 5,510,921   4/1996   Takai et al. ........................... 359/124

OTHER PUBLICATIONS

OHM Corporation, pp. 41–42, Oct. 25, 1993, "Introduction to Optical Switching Technique".

"Shingaku Giho OCS95-3", Vol. 95, No. 65, pp. 16–23, May 24, 1995.

H. Scott Hinton, "Optically Transparent System", *An Introduction To Photonic Switching Fabrics*, Plenum Press, New York, (1993), pp. 83–135.

H. Scott Hinton, *An Introduction To Photonic Switching Fabrics*, Plenum Press, New York, (1993), pp. 24–27.

*Primary Examiner*—Kinfe-Michael Negash
*Attorney, Agent, or Firm*—Spencer & Frank

[57] ABSTRACT

An optical-wavelength interchanger element includes a branching section for bifurcating a wavelength-multiplexed input light signal having a multiplicity of an even number into first and second light signals. The interchanger element further includes a wavelength converting element for simultaneously converting wavelengths multiplexed in the first light signal so as to output a third light signal. The interchanger element further includes a transmission path for sending the second light signal therethrough without converting wavelengths multiplexed in the second light signal. The interchanger element further includes a joining section for combining the third light signal and the second light signal so as to output a wavelength-multiplexed output light signal. The interchanger elements may be connected in series in plural stages so as to form an optical-wavelength interchanger device.

17 Claims, 6 Drawing Sheets

OPTICAL-WAVELENGTH INTERCHANGER ELEMENT AND OPTICAL-WAVELENGTH INTERCHANGER DEVICE

BACKGROUND OF THE INVENTION

1. Field of the Invention

The present invention relates to an optical-wavelength interchanger element for switching between wavelength channels of a wavelength-multiplexed light signal, and an optical-wavelength interchanger device having these optical-wavelength interchanger elements.

2. Description of the Prior Art

A multiplex switching method has been proposed as an optical switching method for switching between a plurality of wavelengths, that is, channels, of a wavelength-multiplexed light signal. As a conventional optical-wavelength interchanger device employing this multiplex switching method, there has been available a wavelength (frequency) switch for use in converting an arbitrary wavelength (frequency) multiplexed signal on an input highway into signals for arbitrary wavelength (frequency) channels on an output highway. This switch is mainly composed of wavelength selecting elements (filters) and wavelength converting elements. In this conventional switch, the N-wave multiplexed (N-channel) input light is separated into respective wavelengths, a wavelength conversion is performed per wavelength, and then the converted wavelengths are again combined into the N-wave multiplexed (N-channel) output light for an output onto the output highway. The foregoing optical-wavelength conversion based on the optical multiplex switching is described, for example, in "Introduction to Optical Switching Technique" published on Oct. 25, 1993 by Ohm Corporation.

However, in the foregoing conventional method, if the switching structure for wavelength-converting the input light with a multiplicity N to derive the output light with a multiplicity N is considered in the form a space-division equivalent circuit, one optical-wavelength interchanger element is required for each wavelength. Accordingly, the optical-wavelength interchanger device requires as many as N control elements when the multiplicity of the input light signal is N.

SUMMARY OF THE INVENTION

Therefore, it is an object of the present invention to provide an improved optical-wavelength interchanger element that can render the number of the optical-wavelength interchanger elements of an optical-wavelength interchanger device smaller than N in case of input light having a multiplicity N.

It is another object of the present invention to provide an optical-wavelength interchanger device constituted by such improved optical-wavelength interchanger elements.

According to one aspect of the present invention, an optical-wavelength interchanger element comprises a branching section for bifurcating a wavelength-multiplexed input light signal from an input transmission path into first and second light signals, the wavelength-multiplexed input light signal having a multiplicity N, wherein $N=2^n$ and n is a positive integer; a wavelength converting element connected to the branching section for simultaneously converting wavelengths multiplexed in the first light signal so as to output a third light signal; a transmission path connected to the branching section for sending the second light signal therethrough without converting wavelengths multiplexed in the second light signal; and a joining section connected to the wavelength converting element and the transmission path for combining the third light signal and the second light signal so as to output a wavelength-multiplexed output light signal to an output transmission path.

It may be arranged that the branching section includes a branching path and first and second wavelength selecting elements, that the branching path includes an input path connected to the input transmission path, a first output path connected to the wavelength converting element via the first wavelength selecting element, and a second output path connected to the transmission path via the second wavelength selecting element, and that the joining section includes a joining path having a first input path connected to the wavelength converting element, a second input path connected to the transmission path, and an output path connected to the output transmission path.

It may be arranged that the branching section includes a branching path having an input path connected to the input transmission path, a first output path connected to the wavelength converting element, and a second output path connected to the transmission path, that the joining section includes a joining path and third and fourth wavelength selecting elements, and that the joining path includes a first input path connected to the wavelength converting element via the third wavelength selecting element, a second input path connected to the transmission path via the fourth wavelength selecting element, and an output path connected to the output transmission path.

It may be arranged that the branching section includes a branching path and first and second wavelength selecting elements, that the branching path includes an input path connected to the input transmission path, a first output path connected to the wavelength converting element via the first wavelength selecting element, and a second output path connected to the transmission path via the second wavelength selecting element, that the joining section includes a joining path and third and fourth wavelength selecting elements, and that the joining path includes a first input path connected to the wavelength converting element via the third wavelength selecting element, a second input path connected to the transmission path via the fourth wavelength selecting element, and an output path connected to the output transmission path.

According to another aspect of the present invention, an optical-wavelength interchanger device comprises a plurality of optical-wavelength interchanger elements, each of the optical-wavelength interchanger elements comprising a branching section for bifurcating a wavelength-multiplexed input light signal from an input transmission path into first and second light signals, the wavelength-multiplexed input light signal having a multiplicity N, wherein $N=2^n$ and n is a positive integer; a wavelength converting element connected to the branching section for simultaneously converting wavelengths multiplexed in the first light signal so as to output a third light signal; a transmission path connected to the branching section for sending the second light signal therethrough without converting wavelengths multiplexed in the second light signal; and a joining section connected to the wavelength converting element and the transmission path for combining the third light signal and the second light signal so as to output a wavelength-multiplexed output light signal to an output transmission path, wherein the optical-wavelength interchanger elements are connected in series in plural stages such that the output transmission path of each optical-wavelength interchanger element works as the input transmission path of the subsequent optical-wavelength interchanger element.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENTS

Now, preferred embodiments of the present invention will be described hereinbelow with reference to the accompanying drawings.

Figure 1:
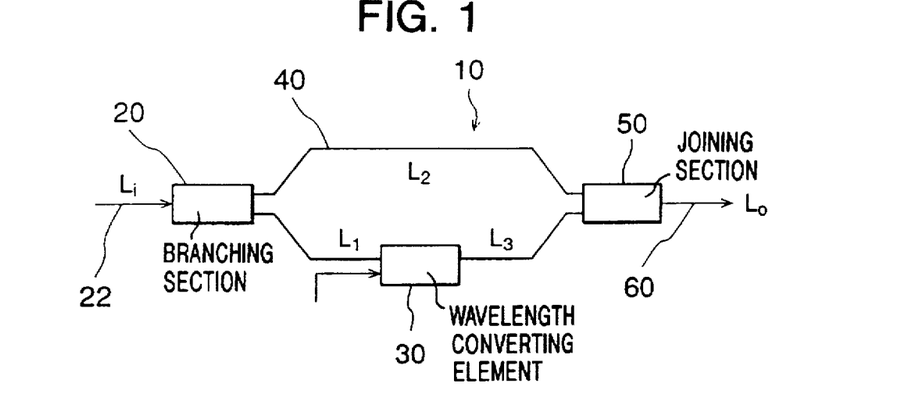
FIG. 1 is a block diagram for explaining the structure of an optical-wavelength interchanger element of the present invention.

FIG. 1 is a block diagram for explaining the structure of an optical-wavelength interchanger element of the present invention. In FIG. 1, an optical-wavelength interchanger element 10 includes a branching section 20, a wavelength converting element 30, a transmission path 40 and a joining section 50.

The branching section 20 bifurcates a wavelength-multiplexed input light signal Li from an input transmission path 22 and feeds a first light signal L1 to the wavelength converting element 30 and a second light signal L2 to the transmission path 40. It is assumed that the multiplicity, that is, the number of channels, of the input light signal Li is N, wherein $N=2^n$ and n is a positive integer.

The converting element 30 is connected to the branching portion 20 and converts all the wavelengths multiplexed in the first light signal L1 simultaneously so as to output a third light signal L3. In the present invention, since the wavelength multiplicity of the input light signal Li is an even number N, such an element is used, as the wavelength converting element 30, that achieves the conversion by inverting the order of the input wavelengths in a mirror symmetrical fashion, and outputs the converted result to the output side. As such a converting element, there have been available various elements, such as an element using a difference frequency generation (DFG) phenomenon, a four-wave mixing wavelength converting element and others, which are described, for example, in "Shingaku Giho OCS95-3" (thesis number). This DFG type wavelength converting element is arranged such that pumping light P having a mean wavelength of the input wavelengths is inputted from the exterior into the DFG type wavelength converting element so as to achieve the conversion of the input wavelengths. Assuming that the wavelength of the pumping light is $\lambda p$, if wavelengths in channels are in a mirror symmetrical relationship with each other relative to approximately double the wavelength $\lambda p$ of the pumping light P, the wavelengths in these channels are interchanged with each other. Accordingly, whether to input only one kind of the pumping light or a plural kinds of the pumping light simultaneously into the wavelength converting element 30 is determined by a design requirement as to a combination of the wavelengths for performing the wavelength conversion.

The transmission path 40 is connected to the branching section 20 and feeds the wavelengths multiplexed in the second light signal L2 to the joining section 50 without conversion thereof.

The joining section 50 is connected to the wavelength converting element 30 and the transmission path 40, respectively, and causes the third light signal L3 and the second light signal L2 to join each other so as to output a wavelength-multiplexed output light signal Lo to an output transmission path 60.

Figure 5:
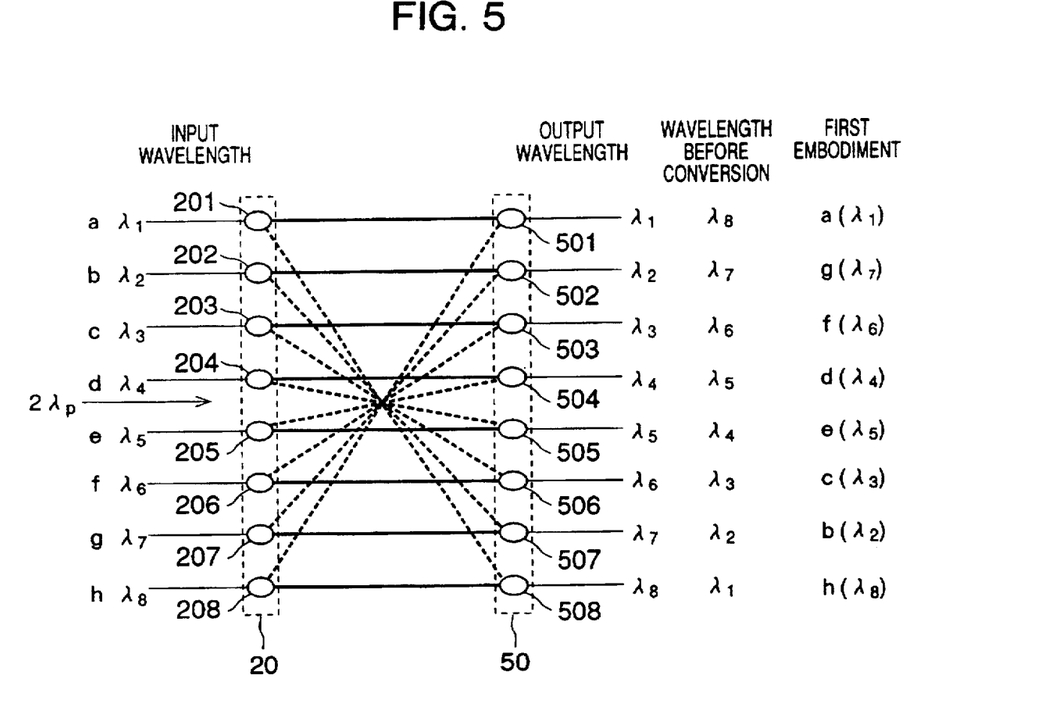
FIG. 5 is a diagram for explaining the operation of the optical-wavelength interchanger element shown in FIG. 1.

Now, the operation of the wavelength interchanger element 10 of the present invention will be described hereinbelow. FIG. 5 is a diagram for explaining the operation thereof. It is assumed that the wavelength multiplicity is N=8, that is, the number of channels is 8, and that individual light signals in the input light signal Li are arranged in order of a ($\lambda 1$), b ($\lambda 2$), c ($\lambda 3$), d ($\lambda 4$), e ($\lambda 5$), f ($\lambda 6$), g ($\lambda 7$), and h ($\lambda 8$), that is, in order of wavelengths and in regular wavelength intervals with ($\lambda 1$) the smallest and ($\lambda 8$) the largest.

The branching section 20 has functions of branch/selection elements 201, 202, 203, 204, 205, 206, 207 and 208 (hereinafter referred to as "20" when generally referred to) corresponding to the first to eighth channels, respectively, and similarly, the joining section 50 has functions of join/selection elements 501, 502, 503, 504, 505, 506, 507 and 508 (hereinafter referred to as "50" when generally referred to) corresponding to the first to eighth channels, respectively. The elements 20 and 50 are connected by the wavelength converting element 30 and the transmission path 40. In FIG. 5, conversion of the light signals is represented by dotted lines, while non-conversion of the light signals is represented by solid lines.

The wavelength converting element 30 converts the wavelength in a mirror symmetrical fashion. For example, it is assumed that the converting element 30 simultaneously converts the wavelengths in all the eight channels. In this case, a wavelength $\lambda p$ of the pumping light P is set to half of the arithmetical mean value of $\lambda 1$ to $\lambda 8$. When this pumping light P is given from an exterior light source (not shown) to the wavelength converting element 30, the wavelengths of the light signals on the respective channels inputted into the elements 20 are converted into the corresponding wavelengths which are in a mirror symmetrical relationship thereto with respect to double the wavelength $\lambda p$ of the pumping light P. Thus, the wavelengths on the respective channels are converted like $\lambda 1 \rightarrow \lambda 8$, $\lambda 2 \rightarrow \lambda 7$, $\lambda 3 \rightarrow \lambda 6$, $\lambda 4 \rightarrow \lambda 5$, $\lambda 5 \rightarrow \lambda 4$, $\lambda 6 \rightarrow \lambda 3$, $\lambda 7 \rightarrow \lambda 2$ and $\lambda 8 \rightarrow \lambda 1$, and fed to the elements 50.

On the other hand, since the light signals passing the transmission path 40 are not converted in wavelength, λ1, λ2, λ3, λ4, λ5, λ6, λ7 and λ8 are fed to the elements 50 as they are. In FIG. 5, on the right of the elements 50, the wavelengths when passing the transmission path 40 and the wavelengths when converted via the converting element 30 are shown in parallel.

There are first to third wavelength conversion methods or achieving the wavelength conversion using the foregoing wavelength interchanger element 10. The first or second method may be used when no crosstalk exists in wavelength selection or the crosstalk can be ignored. On the other hand, the third method may be used when the crosstalk exists in wavelength selection and it is necessary to remove it as much as possible.

In the first wavelength conversion method, the input light signal Li is divided into a wavelength group to be converted and a wavelength group not to be converted, in advance at the branching section 20. In this method, when the wavelength-multiplexed input light signal Li is inputted into the branching section 20, the branching section 20 bifurcates the input light signal Li into the first light signal L1 of the wavelength group which requires the wavelength conversion and the second light signal L2 of the wavelength group which does not require the wavelength conversion. The second light signal L2 is sent to the joining section 50 as it is, while the first light signal L1 is converted in wavelength in a mirror symmetrical fashion via the wavelength converting element 30 and then given to the joining section 50 as the third light signal L3. At the joining section 50, the second light signal and the third light signal are combined so as to derive the wavelength-multiplexed output light signal Lo.

In the second wavelength conversion method, the wavelength selection is not performed in the branching section 20, but performed in the joining section 50. In this method, the branching section 20 does not divide the input light signal Li into the wavelength groups as in the foregoing first method, but provides first and second light signal groups each including all the wavelengths multiplexed in the input light signal Li. Then, all the wavelengths of the first light signal are converted via the converting element 30 for feeding to the joining section 50 as the third light signal L3. On the other hand, the second light signal is given to the joining section 50 as it is with conversion in wavelength. The joining section 50 performs selection of given wavelengths from the second light signal and further performs selection of wavelengths, which do not overlap the wavelengths selected from the second light signal, from the third light signal. Thereafter, the light signals with the selected wavelengths, from the second and third light signals are combined to derive the output light signal Lo.

In the third wavelength conversion method, the foregoing first and second methods are partly combined. In the third method, the wavelength selection is performed both in the branching and joining sections 20 and 50 to remove the crosstalk as much as possible so as to derive the output light signal Lo.

Now, the optical-wavelength interchanger elements according to the preferred embodiments of the present invention for achieving the foregoing methods will be described with reference to FIGS. 2 to 8.

(First Embodiment)

Figure 2:
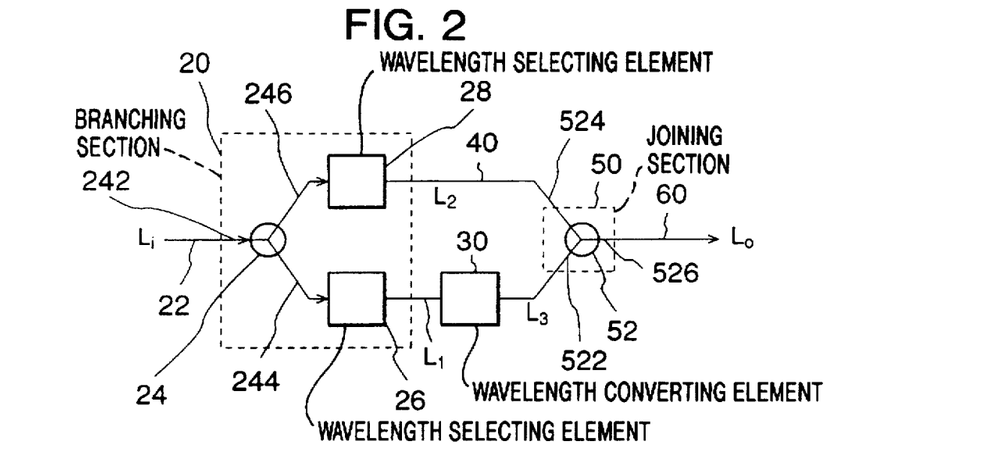
FIG. 2 is a block diagram for explaining the structure of an optical-wavelength interchanger element according to a first preferred embodiment of the present invention.

First, the structure of the optical-wavelength interchanger element 10 for achieving the foregoing first method will be described with reference to FIGS. 2, 5 and 6A–6E. FIG. 2 is a block diagram for explaining the structure of the wavelength interchanger element 10 according to this preferred embodiment. FIGS. 6A–6E are diagrams for explaining of the operation of the wavelength interchanger element 10 according to this preferred embodiment, wherein a transverse axis represents wavelength in a given unit and the vertical axis represents light intensity in the given unit.

In this preferred embodiment, the branching section 20 is constituted by a branching path element 24 and first and second wavelength selecting elements 26 and 28. The branching path 24 includes an input path 242 connected to the input transmission path 22, a first output path 244 connected to the wavelength converting element 30 via the first wavelength selecting element 26, and a second output path 246 connected to the transmission path 40 via the second wavelength selecting element 28. The branching path 24 feeds all the wavelengths of the input light signal Li to the first and second output paths 244 and 246 with half the light power of the input light signal Li, respectively.

Each of the first and second wavelength selecting elements 26 and 28 may be in the form of a known AO (acoustic-optical effect) type wavelength combining element. As this element, an element using a surface acoustic wave, for example, an element which generates a polarisation conversion at a given wavelength due to grating by a surface acoustic wave, can be used. Such an element is described, for example, in "An Introduction to Photonic Switching Fabrics, PLENUM", pages 133–134 (1993). It is known to use the wavelength combining element as a wavelength separating (branching) element.

Figure 6A:
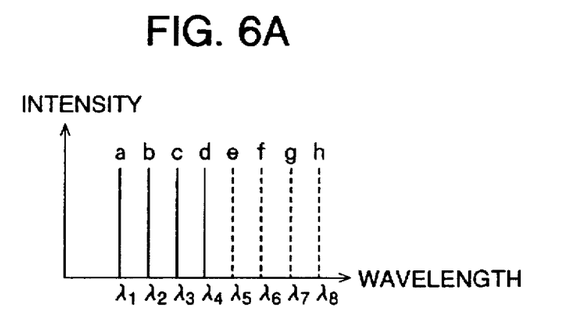
FIGS. 6A–6E are diagrams for explaining the operation of the optical-wavelength interchanger element shown in FIG. 2.
Figure 6B:
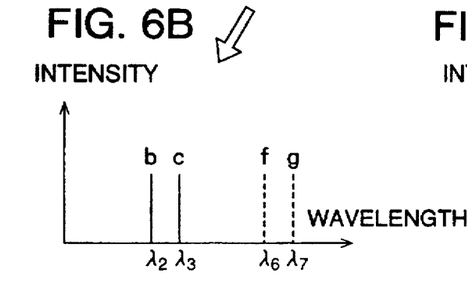
Figure 6C:
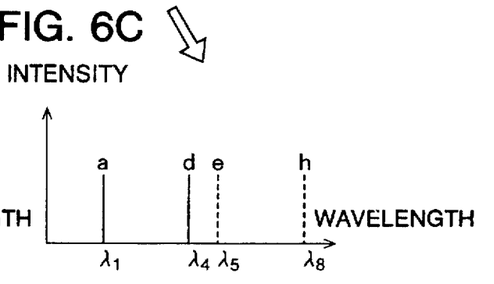

With the foregoing arrangement of the branching section 20, when a light signal Li (a–h) with wavelengths multiplexed in the order shown in FIG. 6A is inputted via the input transmission path 22, each of the wavelengths is reduced by half in light power at the branching path element 24 and given to the first and second wavelength selecting elements 26 and 28 where the wavelength selection is performed. For example, if the first wavelength selecting element 26 selects light signals b, c, f and g with wavelengths λ2, λ3, λ6 and λ7, a first light signal L1 is derived as shown in FIG. 6B. On the other hand, the second wavelength selecting element 28 selects wavelengths which are different from those selected by the first wavelength selecting element 26. Thus, the second wavelength selecting element 28 selects light signals a, d, e and h with wavelengths λ1, λ4, λ5 and λ8 for feeding to the transmission path 40 as a second light signal L2 as shown in FIG. 6C.

Figure 6D:
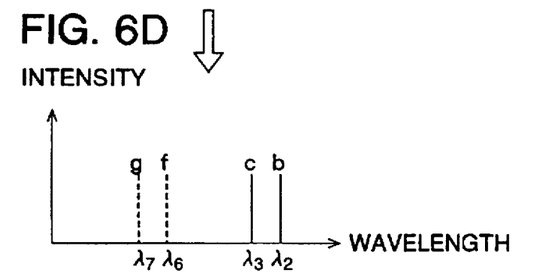

The first light signal L1 (b, c, f, g) is sent to the wavelength converting element 30 to be converted in wavelength therethrough. To the wavelength converting element 30 is given pumping light P having a wavelength λp which is approximately half an arithmetical mean value of λ2, λ3, λ6 and λ7. Then, the wavelengths in the channels of the light signals b, c, f and g (first light signal L1) are converted in a mirror symmetrical fashion like λ2→λ7, λ3→λ6, λ6→λ3, λ7→λ2 so that a third light signal L3 (g, f, c, b) is derived as shown in FIG. 6D. Specifically, in the third light signal L3, the wavelengths in the channels are interchanged with each other like the signal g into the channel of the signal b, the signal f into the channel of the signal c, the signal c into the channel of the signal f and the signal b into the channel of the signal g.

The third light signal L3 converted in wavelength in the foregoing manner and the second light signal L2, which is not converted in wavelength, are fed to the joining section 50. The joining section 50 is constituted by a joining path element 52. The joining path element 52 includes a first input path 522 connected to the wavelength converting element 30, a second input path 524 connected to the transmission path 40 and an output path 526 connected to the output transmission path 60. As will be appreciated, the joining path element 52 is the same as the branching path element 24 in structure, but the light entering/exiting direction is reverse to that relative to the branching path element 24. The joining section 50 may be in the form of a simple wavelength combining element if a conversion efficiency of the wavelength converting element 30 can be assumed to be 100%.

Figure 6E:
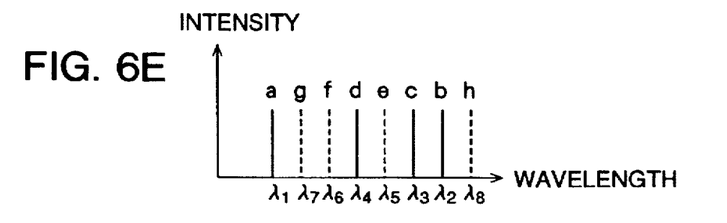

When the third and second light signals are fed to the joining section 50 from the wavelength converting element 30 and the transmission path 40, they are combined to be an output light signal Lo as shown in FIG. 6E, wherein the wavelengths on the channels are partly interchanged like a, g, f, d, e, c, b and h in the order named. The output light signal Lo is outputted onto the output transmission path 60.

The operation of the first preferred embodiment will be further described hereinbelow with reference to FIG. 5. In this preferred embodiment, since the wavelengths $\lambda 2$, $\lambda 3$, $\lambda 6$ and $\lambda 7$ on the channels of the light signals b, c, f and g are converted in a mirror symmetrical fashion, the converted wavelength at the output-side channel element 502 corresponding to the input-side channel element 202 becomes $\lambda 7$, and similarly, $\lambda 6$ at the output-side channel element 503 corresponding to the input-side channel element 203, $\lambda 3$ at the output-side channel element 506 corresponding to the input-side channel element 206, and $\lambda 2$ at the output-side channel element 507 corresponding to the input-side channel element 207. On the other hand, since the light signal passing through the transmission path 40 is not converted in wavelength, the wavelength remains $\lambda 1$ at the output-side channel element 501 corresponding to the input-side channel element 201, and similarly, the wavelength $\lambda 4$ at the output-side channel element 504 corresponding to the input-side channel element 204, $\lambda 5$ at the output-side channel element 505 corresponding to the input-side channel element 205, and $\lambda 8$ at the output-side channel element 508 corresponding to the input-side channel element 208. Thus, in this preferred embodiment, the wavelengths of the signals on the channels of the output light signal Lo become a ($\lambda 1$), g ($\lambda 7$), f ($\lambda 6$), d ($\lambda 4$), e ($\lambda 5$), c ($\lambda 3$), b ($\lambda 2$) and h ($\lambda 8$) in the order named. This conversion example of the first preferred embodiment is shown in FIG. 5.

(Second Embodiment)

Figure 3:
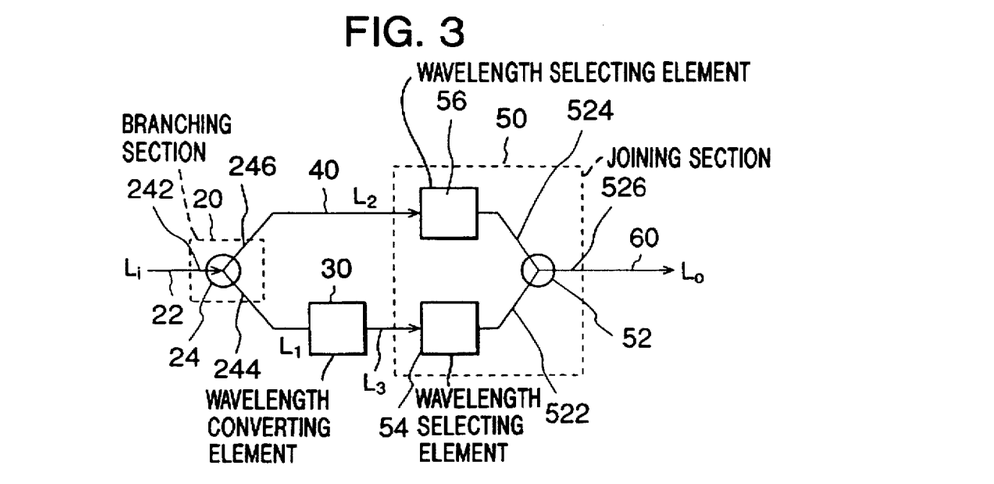
FIG. 3 is a block diagram for explaining the structure of an optical-wavelength interchanger element according to a second preferred embodiment of the present invention.

Now, the structure of the optical-wavelength interchanger element 10 for achieving the foregoing second method will be described with reference to FIGS. 3 and 7A–7G. FIG. 3 is a block diagram for explaining the structure of the wavelength interchanger element 10 according to this preferred embodiment. FIGS. 7A–7G are diagrams for explaining the operation of the wavelength interchanger element 10 according to this preferred embodiment, wherein the transverse axis represents wavelength in a given unit and the vertical axis represents light intensity in the given unit. In this preferred embodiment, the wavelength-multiplexed input light signal Li is the same as that in the foregoing first preferred embodiment.

In the second preferred embodiment, as opposed to the first preferred embodiment, the wavelength selection is not performed at the branching section 20, but is performed at the joining section 50. The other structure is the same as that of the first preferred embodiment. Accordingly, in the structure of FIG. 3, the branching section 20 is constituted by the branching path element 24. The branching path element 24 includes the input path 242 connected to the input transmission path 22, the first output path 244 connected to the wavelength converting element 30, and the second output path 246 connected to the transmission path 40.

On the other hand, the joining section 50 is constituted by the joining path 52 and third and fourth wavelength selecting elements 54 and 56. As will be appreciated, the joining section 50 can be constituted by the same elements as those of the branching section 20 shown in FIG. 2, but the light entering/exiting direction is reverse to that in the structure of FIG. 2. Accordingly, the joining path 52 includes the first input path 522 connected to the wavelength converting element 30 via the third wavelength selecting element 54, the second input path 524 connected to the transmission path 40 via the fourth wavelength selecting element 56, and the output path 526 connected to the output transmission path 60. Each of the third and fourth wavelength selecting elements 54 and 56 may be in the form of the known AO (acoustic-optical effect) type wavelength combining element as referred to in the foregoing first preferred embodiment.

Figure 7A:
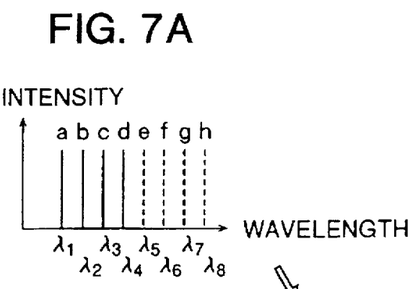
FIGS. 7A–7G are diagrams for explaining the operation of the optical-wavelength interchanger element shown in FIG. 3.
Figure 7B:
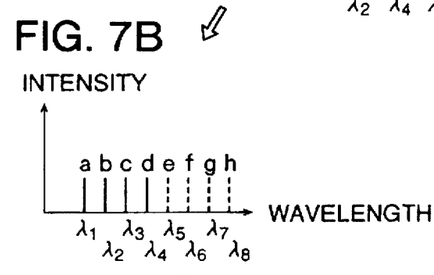
Figure 7C:
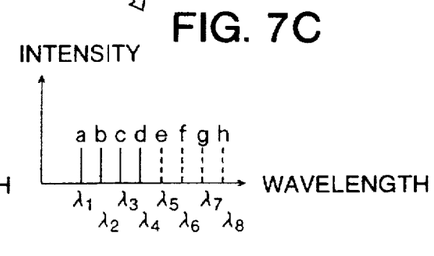

In the second preferred embodiment, as shown in FIG. 7A, the order of the wavelengths on the channels of the input light signal Li is the same as that shown in FIG. 6 in the foregoing first preferred embodiment. When this light signal Li is inputted into the branching section 20, the branching path 24 feeds all the wavelengths of the input light signal Li to the first and second output paths 244 and 246 as first and second light signals L1 and L2, reducing the light power of the input light signal Li by half, respectively. The first light signal L1 on the first output path 244 is shown in FIG. 7B, while the second light signal L2 on the second output path 246 is shown in FIG. 7C.

Figure 7D:
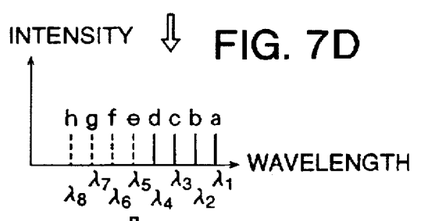

The first light signal L1 is sent to the wavelength converting element 30 where all the wavelengths of signal L1 are converted in a mirror symmetrical fashion to derive a third light signal L3 for feeding to the joining section 50. To the wavelength converting element 30 is given pumping light P having a wavelength $\lambda p$ which is set to approximately half an arithmetical mean value of the wavelengths $\lambda 1$ to $\lambda 8$. The third light signal L3 thus obtained is shown in FIG. 7D. On the other hand, the second light signal L2 is fed to the joining section 50 without wavelength conversion thereof.

Figure 7E:
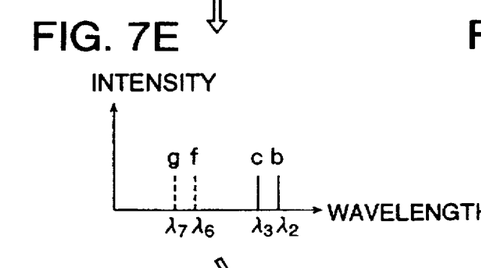
Figure 7F:
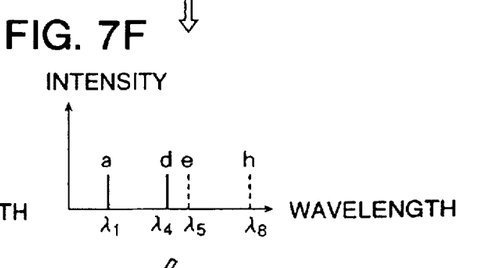
Figure 7G:
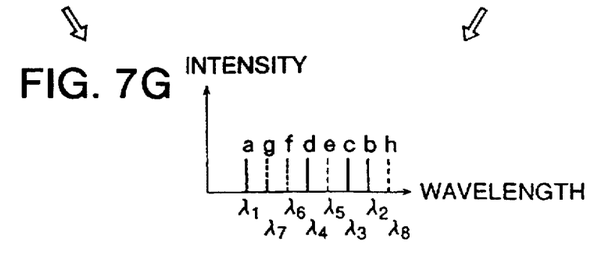

Then, the wavelength selection is performed at the third and fourth wavelength selecting elements 54 and 56 such that the selected wavelengths of the third and second light signals L3 and L2 do not overlap with each other. If the third wavelength selecting element 54 is set to select the wavelengths $\lambda 7$, $\lambda 6$, $\lambda 3$ and $\lambda 2$ as in the foregoing first preferred embodiment, the light signals on the channels of the third light signal L3 become g ($\lambda 7$), f ($\lambda 6$), c ($\lambda 3$) and b ($\lambda 2$) in the order named as shown in FIG. 7E. On the other hand, through the wavelength selection achieved by the fourth wavelength selecting element 56, the light signals on the channels of the second light signal L2 become a ($\lambda 1$), d ($\lambda 4$), e ($\lambda 5$) and h ($\lambda 8$) in the order named as shown in FIG. 7F. The third light signal [g ($\lambda 7$), f ($\lambda 6$), c ($\lambda 3$), b ($\lambda 2$)] and the second light signal [a ($\lambda 1$), d ($\lambda 4$), e ($\lambda 5$), h ($\lambda 8$) ] join at the joining section 52 so as to be a wavelength-multiplexed output light signal Lo for feeding to the output transmission path 60. In the output light signal Lo, the wavelengths on the channels are partly interchanged like a, g, f, d, e, c, b and h in the order named as shown in FIG. 7G and as in the foregoing first preferred embodiment.

(Third Embodiment)

According to the foregoing first and second preferred embodiments, the optical-wavelength interchanger element can be constituted in a simple structure by combining the known branching means, wavelength converting element and joining means. On the other hand, if crosstalk exists in wavelength selection, the foregoing third method is effective for suppressing it.

Figure 4:
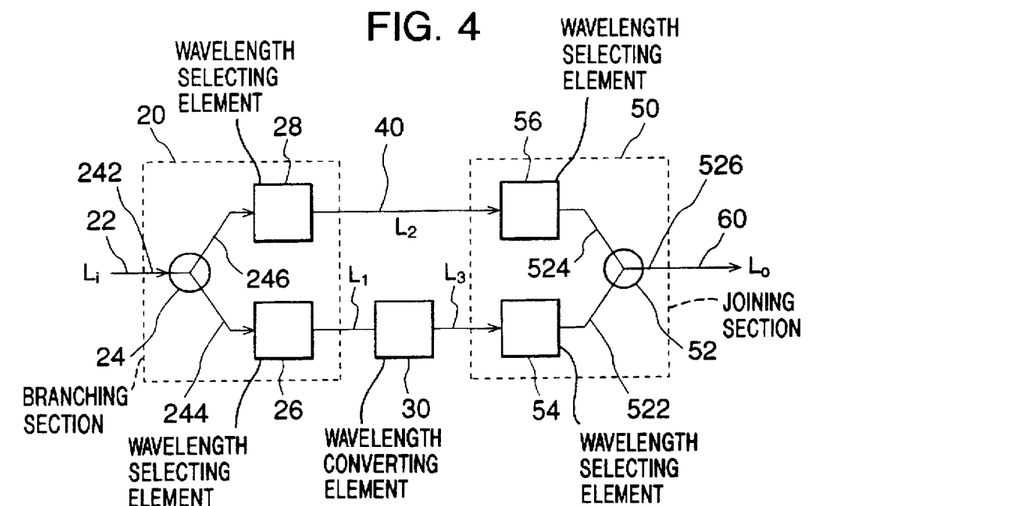
FIG. 4 is a block diagram for explaining the structure of an optical-wavelength interchanger element according to a third preferred embodiment of the present invention.

Now, the structure of the optical-wavelength interchanger element 10 for achieving the foregoing third method will be described with reference to FIGS. 4 and 8A–8G. FIG. 4 is a block diagram for explaining the structure of the wavelength interchanger element 10 according to this preferred embodiment. FIGS. 8A–8G are diagrams for explaining the operation of the wavelength interchanger element 10 according to this preferred embodiment, wherein the transverse axis represents wavelength in a given unit and the vertical axis represents light intensity in the given unit. In this preferred embodiment, the wavelength-multiplexed input light signal Li is the same as that in the foregoing first preferred embodiment.

In the third preferred embodiment, as opposed to the first and second preferred embodiments, wavelength selection is performed both at the branching section 20 and at the joining section 50. The other structure is the same as that of the first or second preferred embodiment. Accordingly, in the structure of FIG. 4, the branching section 20 is constituted by the branching path element 24 and the first and second wavelength selecting elements 26 and 28 as in the foregoing first preferred embodiment. The branching path element 24 includes the input path 242 connected to the input transmission path 22, the first output path 244 connected to the first wavelength selecting element 26, and the second output path 246 connected to the second wavelength selecting element 28.

The first light signal L1 from the first wavelength selecting element 26 is given to the wavelength converting element 30 where the signal L1 is converted in wavelength so as to be the third light signal L3 for feeding to the joining section 50. On the other hand, the second light signal L2 from the second wavelength selecting element 28 is given to the joining section 50 without wavelength conversion thereof.

The joining section 50 is constituted by the joining path element 52 and the third and fourth wavelength selecting elements 54 and 56 as in the foregoing second preferred embodiment. The joining section 50 can be constituted by the same elements as those of the branching section 20 shown in FIG. 2, but the light entering/exiting direction is reverse to that in the structure of FIG. 2. Accordingly, the joining path element 52 includes the first input path 522 connected to the wavelength converting element 30 via the third wavelength selecting element 54, the second input path 524 connected to the transmission path 40 via the fourth wavelength selecting element 56, and the output path 526 connected to the output transmission path 60.

Each of the first to fourth wavelength selecting elements 26, 28, 54 and 56 may be in the form of the known AO (acoustic-optical effect) type wavelength combining element as referred to in the foregoing first and second preferred embodiments.

Figure 8A:
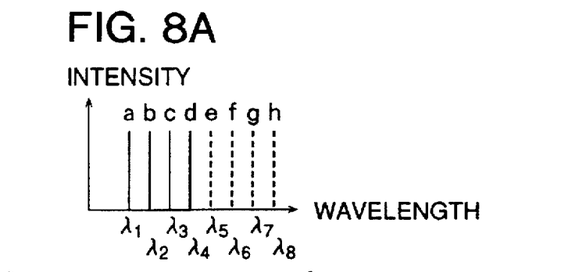
FIGS. 8A–8G are diagrams for explaining the operation of the optical-wavelength interchanger element shown in FIG. 4.
Figure 8B:
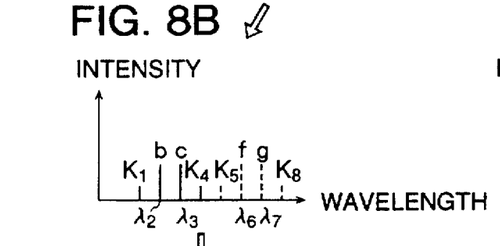
Figure 8C:
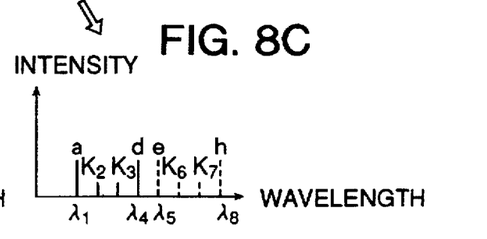

In the third preferred embodiment, when crosstalk occurs in the wavelength selection at the wavelength selecting elements, so that wavelengths other than the selected wavelengths are outputted, such crosstalk influences can be removed. As shown in FIG. 8A, the order of the wavelengths on the channels of the input light signal Li is the same as that shown in FIG. 6A in the foregoing first preferred embodiment. When this light signal Li is inputted into the branching section 20, the branching path element 24 feeds all the wavelengths of the input light signal Li to the first and second wavelength selecting elements 26 and 28 via the first and second output paths 244 and 246, reducing the light power of the input light signal Li by half, respectively. At the first and second wavelength selecting elements 26 and 28, the wavelength selection is performed as in the foregoing first preferred embodiment to derive the first light signal L1 and the second light signal L2, respectively. The first light signal L1 is shown in FIG. 8B and the second light signal L2 is shown in FIG. 8C, wherein k1, k2, k3, k4, k5, k6, k7 and k8 represent crosstalk signals corresponding to $\lambda 1$, $\lambda 2$, $\lambda 3$, $\lambda 4$, $\lambda 5$, $\lambda 6$, $\lambda 7$ and $\lambda 8$, respectively.

Figure 8D:
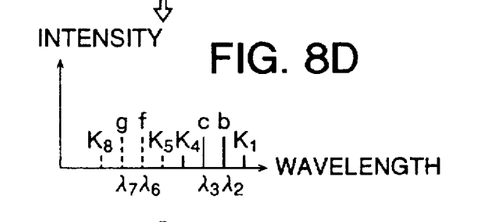

The first light signal L1 is sent to the wavelength converting element 30 where all the wavelengths of the signal L1 are converted to derive the third light signal L3 for feeding to the joining section 50. To the wavelength converting element 30 is given the pumping light P having the wavelength $\lambda p$ which is approximately half the arithmetical mean value of $\lambda 2$, $\lambda 3$, $\lambda 6$ and $\lambda 7$ as in the foregoing first preferred embodiment. The third light signal L3 is shown in FIG. 8D and given to the joining section 50 as including the crosstalk signals. On the other hand, the second light signal L2 including the crosstalk signals is also given to the joining section 50 without wavelength conversion thereof.

Figure 8E:
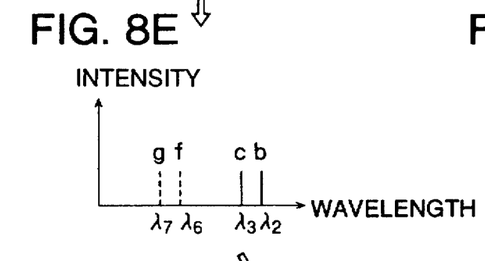
Figure 8F:
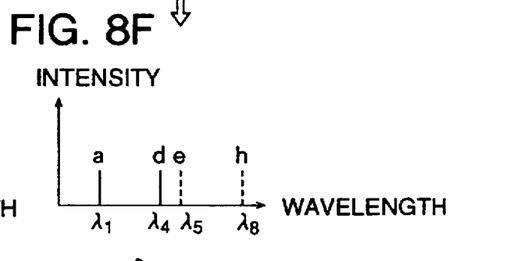
Figure 8G:
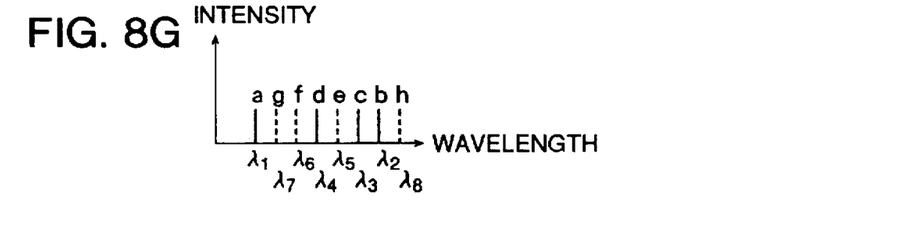

Then, the wavelength selection is performed at the third and fourth wavelength selecting elements 54 and 56 such that the selected wavelengths of the third and second light signals L3 and L2 do not overlap with each other. In this preferred embodiment, the wavelengths selected at the first and third wavelength selecting elements 26 and 54 are set to be the same with each other, and the wavelengths selected at the second and fourth wavelength selecting elements 28 and 56 are set to be the same with each other. Accordingly, through the wavelength selection at the third wavelength selecting element 54, the crosstalk signals are removed from the third light signal L3 from the converting element 30 so that the light signal [g ($\lambda 7$), f ($\lambda 6$), c ($\lambda 3$), b ($\lambda 2$)] as shown in FIG. 8E is derived. On the other hand, through the wavelength selection at the fourth wavelength selecting element 56, the crosstalk signals are removed from the second light signal L2 from the second wavelength selecting element 28 so that the light signal [a ($\lambda 1$), d ($\lambda 4$), e ($\lambda 5$), h ($\lambda 8$)] as shown in FIG. 8F is derived. The light signals from the third and fourth wavelength selecting elements 54 and 56 join at the joining path element 52 so as to be a wavelength-multiplexed output light signal Lo for feeding to the output transmission path 60. In the output light signal Lo, the wavelengths on the channels are partly interchanged like a, g, f, d, e, c, b and h in the order named as in the foregoing first and second preferred embodiments, and further, the crosstalk is removed or largely suppressed. This output light signal Lo is shown in FIG. 8G.

(Fourth Embodiment)

Figure 9:
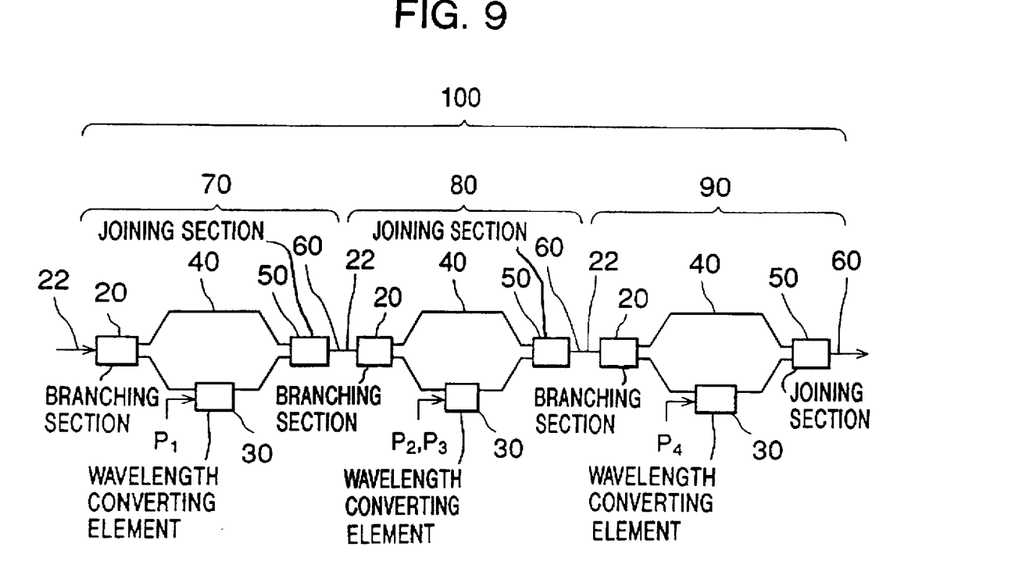
FIG. 9 is a block diagram for explaining the structure of an optical-wavelength interchanger device according to a fourth preferred embodiment of the present invention.

Now, an optical-wavelength interchanger device according to the fourth preferred embodiment will be described hereinbelow with reference to FIGS. 9 and 10. The optical-wavelength interchanger device is constituted by combining the foregoing optical-wavelength interchanger elements 10 shown in FIG. 1, that is, the embodiments of FIG. 2, FIG. 3 and/or FIG. 4. FIG. 9 is a block diagram showing an optical-wavelength interchanger device 100 of a rearrangeable non blocking type 4×4 element structure in which the optical-wavelength interchanger elements are connected in series in three stages. In this preferred embodiment, the interchanger elements are connected in series such that the output transmission passage of the interchanger element at a certain state works as the input transmission path of the interchanger element at a subsequent step. In FIG. 9, numerals 70, 80 and 90 represent the interchanger elements of the first, second and third stages, respectively. Since the components of the interchanger element at each stage are the same as those shown in FIG. 1, further explanation thereof will be omitted for avoiding redundant disclosure.

Although three stages are shown in FIG. 9, the number of the stages can be determined depending on the designing request. Further, how to combine the interchanger elements of the foregoing first to third preferred embodiments is also optional.

In FIG. 9, P1 denotes pumping light for the interchanger element 70, P2 and P3 pumping light for the interchanger element 80, and P4 pumping light for the interchanger element 90.

Now, the operation of the interchanger device 100 thus structured will be described hereinbelow with reference to FIG. 10, wherein a multiplicity N, that is, the number of channels, of an input light signal is four.

Figure 10:
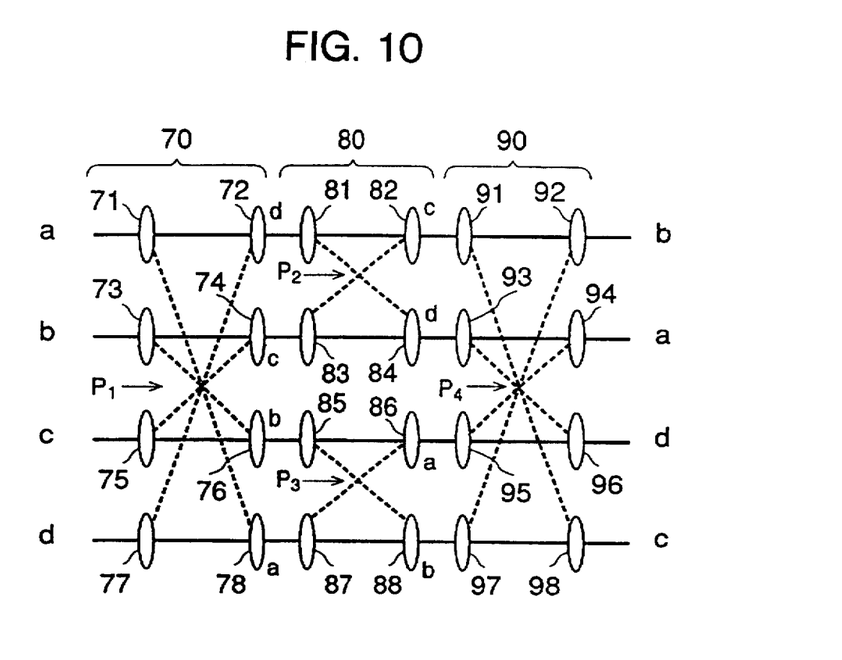
FIG. 10 is a diagram for explaining the operation of the optical-wavelength interchanger device shown in FIG. 9.

FIG. 10 is an explanatory diagram showing a dilated Benes network type (see the previously-mentioned "An Introduction to Photonic Switching Fabrics," pages 83–113), wherein the middle stage 80 shown in FIG. 9 is in the form of 2×2 wiring. The interchanger device 100 includes, at the respective stages 70, 80 and 90, branch/selection elements 71, 73, 75, 77; 81, 83, 85, 87; 91, 93, 95, 97 and join/selection elements 72, 74, 76, 78; 82, 84, 86, 88; 92, 94, 96, 98, corresponding to the four channels of wavelengths $\lambda 1$, $\lambda 2$, $\lambda 3$ and $\lambda 4$. Transmission of the light signal between the branch/selection element and the join/selection element is performed along a route shown by a solid line when no wavelength conversion is performed and along a route shown by a dotted line when wavelength conversion is performed.

It is assumed that the wavelength conversion is performed. In this preferred embodiment, light signals a, b, c and d having $\lambda 1$, $\lambda 2$, $\lambda 3$ and $\lambda 4$ are inputted into the elements 71, 73, 75 and 77 of the first stage 70 and are converted in a mirror symmetrical fashion by means of the pumping light P1 having a wavelength $\lambda p1$ set to approximately half an arithmetical mean value of $\lambda 1$, $\lambda 2$, $\lambda 3$ and $\lambda 4$. Thus, the light signals d, c, b and a are given to the elements 72, 74, 76 and 78, respectively, and then inputted to the elements of the second stage 80 in the order named.

The second stage 80 is arranged so as to achieve wavelength conversion between the adjacent two channels. Thus, the pumping light P2 having a wavelength $\lambda p2$ (approximately half an arithmetical mean value of $\lambda 1$ and $\lambda 2$) and the pumping light P3 having a wavelength $\lambda p3$ (approximately half an arithmetical mean value of $\lambda 3$ and $\lambda 4$) are simultaneously given to the converting element 30. By means of the pumping light P2, wavelength conversion is performed between $\lambda 1$ and $\lambda 2$ so that the light signal with $\lambda 2$ is inputted to the element 82 while the light signal with $\lambda 1$ is inputted to the element 84. Similarly, by means of the pumping light P3, wavelength conversion is perfomed between $\lambda 3$ and $\lambda 4$ so that the light signal with $\lambda 4$ is inputted to the element 86 while the light signal with $\lambda 3$ is inputted to the element 88.

In the third stage 90, a wavelength $\lambda p4$ of the pumping light P4 is set to approximately half the arithmetical mean value of $\lambda 1$, $\lambda 2$, $\lambda 3$ and $\lambda 4$ as in the first stage. In the third stage 90, the light signals inputted to the elements 91, 93, 95 and 97 in order of c, d, a an d b are converted in wavelength by means of the pumping light P4, so as to be inputted to the elements 92, 94, 96 and 98 in order of b, a, d and c and further outputted therefrom in the order named.

As described above, the order of the wavelengths $\lambda 1$, $\lambda 2$, $\lambda 3$ and $\lambda 4$ in the first stage 70 is interchanged at the output side of the final stage 90 so as to be in order of $\lambda 2$, $\lambda 1$, $\lambda 4$ and $\lambda 3$. Further, as will be appreiated from the operation represented in FIG. 10, the optical-wavelength interchanger device 100 can achieve the rearrangeable non blocking type operation, wherein the signals do not overlap in the light paths between the first and second stages 70 and 80 and between the second and third stages 80 and 90.

Further, as will be appreciated, in the foregoing fourth preferred embodiment, the number of the connectable stages, that is, the connectable interchanger elements, of the interchanger device is identified by $[(2\log_2 N)-1]$ at the maximum.

It may be arranged that the wavelength selection and the wavelength conversion are performed in each stage like, for example, in the foregoing first preferred embodiment so as to achieve the order of the wavelengths at the output side of the final stage 90 which is free of the wavelength order at the input side of the initial stage 70.

Although the fourth preferred embodiment relates to the Benes network type as a technique for multi-stage connection, another type, such as a generalized shuffle exchange net type (see the previously-mentioned "An Introduction to Photonic Switching Fabrics," pages 83–113) may also be employed.

While the present invention has been described in terms of the preferred embodiments, the invention is not to be limited thereto, but can be embodied in various ways without departing from the principle of the invention as defined in the appended claims.

For example, the number of the pumping light for the wavelength conversion can be determined depending on how to design the wavelength multiplicity, the wavelength conversion or the like. Further, the light paths for connection between the branching section and the wavelength converting element, between the wavelength converting element and the joining section or the like of the interchanger element may be in the form of waveguide paths provided on the substrate, optical fibers or spaces.

What is claimed is:

1. An optical-wavelength interchanger element, comprising:

a branching section for bifurcating a wavelength-multiplexed input light signal from an input transmission path into first and second light signals, said wavelength-multiplexed input light signal having a multiplicity N, wherein $N=2^n$ and n is a positive integer;

a wavelength converting element connected to said branching section for simultaneously converting wavelengths multiplexed in said first light signal so as to output a third light signal;

a transmission path connected to said branching section for sending said second light signal therethrough without converting wavelengths multiplexed in said second light signal; and a joining section connected to said wavelength converting element and said transmission path for combining said third light signal and said second light signal so as to output a wavelength-multiplexed output light signal to an output transmission path.

2. The optical-wavelength interchanger element according to claim 1, wherein said branching section includes a branching path element and first and second wavelength selecting elements, wherein said branching path element includes an input path connected to said input transmission path, a first output path connected to said wavelength converting element via said first wavelength selecting element, and a second output path connected to said transmission path via said second wavelength selecting element, and wherein said joining section includes a joining path element having a first input path connected to said wavelength converting element, a second input path connected to said transmission path, and an output path connected to said output transmission path.

3. The optical-wavelength interchanger element according to claim 1, wherein said branching section includes a branching path element having an input path connected to said input transmission path, a first output path connected to said wavelength converting element, and a second output path connected to said transmission path, wherein said joining section includes a joining path element and a third and fourth wavelength selecting elements, and wherein said joining path element includes a first input path connected to said wavelength converting element via said third wavelength selecting element, a second input path connected to said transmission path via said fourth wavelength selecting element, and an output path connected to said output transmission path.

4. The optical-wavelength interchanger element according to claim 1, wherein said branching section includes a branching path element and first and second wavelength selecting elements, wherein said branching path element includes an input path connected to said input transmission path, a first output path connected to said wavelength converting element via said first wavelength selecting element, and a second output path connected to said transmission path via said second wavelength selecting element, wherein said joining section includes a joining path element and third and fourth wavelength selecting elements, and wherein said joining path element includes a first input path connected to said wavelength converting element via said third wavelength selecting element, a second input path connected to said transmission path via said fourth wavelength selecting element, and an output path connected to said output transmission path.

5. The optical-wavelength interchanger element according to claim 1, wherein said third light signal is wavelength-multiplexed and includes the wavelengths present in the first light signal.

6. The optical-wavelength interchanger element according to claim 5, wherein said wavelength converting element comprises means for receiving pumping light at a pumping light wavelength and for converting the wavelengths in said first light signal mirror-symmetrically with respect to said pumping light wavelength.

7. An optical-wavelength interchanger device, comprising:
a plurality of optical-wavelength interchanger elements, each of said optical-wavelength interchanger elements including
a branching section for bifurcating a wavelength-multiplexed input light signal from an input transmission path into first and second light signals, said wavelength-multiplexed input light signal having a multiplicity N, wherein $N=2^n$ and n is a positive integer;
a wavelength converting element connected to said branching section for simultaneously converting wavelengths multiplexed in said first light signal so as to output a third light signal;
a transmission path connected to said branching section for sending said second light signal therethrough without converting wavelengths multiplexed in said second light signal; and
a joining section connected to said wavelength converting element and said transmission path for combining said third light signal and said second light signal so as to output a wavelength-multiplexed output light signal to an output transmission path;
wherein said optical-wavelength interchanger elements are connected in series in a plurality of stages such that said output transmission path of each optical-wavelength interchanger element serves as said input transmission path of the subsequent optical-wavelength interchanger element.

8. An optical-wavelength interchanger device according to claim 7, wherein said plurality of stages are connected in a shuffle exchange network.

9. An optical-wavelength interchanger device according to claim 7, wherein said third light signal in each of said optical-wavelength interchanger elements is a wavelength-multiplexed signal.

10. An optical-wavelength interchanger device according to claim 7, wherein said plurality of stages comprises at least n stages of optical-wavelength interchanger elements.

11. An optical-wavelength interchanger device according to claim 7, wherein said plurality of stages are connected in a Benes network.

12. An optical-wavelength interchanger element, comprising:
a branching section for bifurcating a wavelength-multiplexed input light signal from an input transmission path into first and second light signals, each of said first and second light signals carrying a dynamically reconfigurable subset of wavelengths extracted from said wavelength-multiplexed input light signal;
a wavelength converting element connected to said branching section for simultaneously converting wavelengths multiplexed in said first light signal so as to output a third light signal;
a transmission path connected to said branching section for sending said second light signal therethrough without converting wavelengths multiplexed in said second light signal; and
a joining section connected to said wavelength converting element and said transmission path for combining said third light signal and said second light signal so as to output a wavelength-multiplexed output light signal to an output transmission path.

13. The optical-wavelength interchanger element according to claim 12, wherein said dynamically reconfigurable subsets comprise a first subset of wavelengths which are present in said first light signal and a second subset of wavelength which are present in the second light signal, each of said first and second light signals additionally including cross-talk with wavelengths of the other subset, and wherein said joining section comprises means for reducing cross-talk by removing light at said first subset of wavelengths from said second light signal and for removing light at said second subset of wavelengths from said third light signal before said second and third light signals are combined.

14. The optical wavelength interchanger of claim 12, wherein said wavelength-multiplexed input light signal has a multiplicity N, where $N=2^n$ and n is a positive integer.

15. An optical-wavelength interchanger element, comprising:
- a branching section for bifurcating a wavelength-multiplexed input light signal from an input transmission path into first and second light signals;
- a wavelength converting element connected to said branching section for simultaneously converting wavelengths multiplexed in said first light signal so as to output a third light signal;
- a transmission path connected to said branching section for sending said second light signal therethrough without converting wavelengths multiplexed in said second light signal; and
- a joining section connected to said wavelength converting element and said transmission path for combining a dynamically reconfigurable subset of wavelengths from said third light signal and a dynamically reconfigurable subset of wavelengths from said second light signal so as to output a wavelength-multiplexed output light signal to an output transmission path.

16. The optical-wavelength interchanger element according to claim 15, wherein said wavelength-multiplexed input light signal has a multiplicity N, where $N=2^n$ and n is an integer.

17. An optical-wavelength interchanger element, comprising:
- a branching path element for splitting an input light signal into first and second portions which are subsequently recombined to form an output light signal, the input light signal being wavelength-multiplexed and having a plurality of wavelengths;
- means for selecting a first subset of the wavelengths in the first portion of the light signal before the first portion is recombined with the second portion; and
- means for selecting a symmetrically converted second subset of the wavelengths in the second portion of the light signal before the second portion is recombined with the first portion.

* * * * *